United States Patent [19]

Gancy et al.

[11] 4,039,618

[45] Aug. 2, 1977

[54] TREATMENT OF SODIUM CARBONATE CRYSTALLIZER MOTHER LIQUORS

[75] Inventors: Alan B. Gancy; Rustom P. Poncha, both of Syracuse, N.Y.

[73] Assignee: Allied Chemical Corporation, Morris Township, N.J.

[21] Appl. No.: 587,584

[22] Filed: June 17, 1975

[51] Int. Cl.$^2$ .............................................. C01D 7/00
[52] U.S. Cl. .............................. 423/206 T; 23/302 T; 423/186; 423/421
[58] Field of Search .................... 423/184, 206 T, 421, 423/186; 23/302 T

[56] References Cited

U.S. PATENT DOCUMENTS

| | | | |
|---|---|---|---|
| 1,273,110 | 7/1918 | Mitchell | 423/169 |
| 3,689,218 | 9/1972 | Hodges | 423/636 |
| 3,870,780 | 3/1975 | Guptill | 423/206 T |

OTHER PUBLICATIONS

Kirk-Othmer, Encyclopedia of Chemical Technology, 2nd Edition, vol. 12, 1967.

Primary Examiner—O. R. Vertiz
Assistant Examiner—Wayne A. Langel
Attorney, Agent, or Firm—Gerhard H. Fuchs; Anthony J. Stewart

[57] ABSTRACT

In the process for making sodium carbonate from trona, the soluble silicate content of crystallizer mother liquor from which sodium carbonate precursor crystals are obtained by evaporative crystallization is reduced by digesting the mother liquor at elevated temperature in the presence of certain activated insolubles, followed by separating the insolubles from the digested mother liquor. These activated insolubles are obtained by calcining crushed trona, dissolving the calcined trona in an aqueous medium to obtain a solution of sodium carbonate containing insolubles, separating the insolubles and activating them by calcination at elevated temperature.

9 Claims, No Drawings

TREATMENT OF SODIUM CARBONATE CRYSTALLIZER MOTHER LIQUORS

BACKGROUND OF THE INVENTION

Trona deposits in Sweetwater and adjacent counties in Wyoming are found at depths of about 1500 feet underground and consist of a main trona bed varying from 8 to 10 feet in thickness. The trona consist mainly of sodium sesquicarbonate ($Na_2CO_3 \cdot NaHCO_3 \cdot 2H_2O$) containing about 3 to 15% or, more generally, 5 to 10% of insoluble impurities, mainly shale.

A typical natural trona composition is given below:

| A typical natural trona composition is given below: | |
|---|---|
| $Na_2CO_3$ | 41.8% |
| $NaHCO_3$ | 33.1% |
| $H_2O$ | 14.1% |
| | 89.0% |
| Insolubles: | |
| Dolomite $CaCO_3 \cdot MgCO_3$ | 5.5% |
| Quartz $SiO_2$ | 1.1% |
| Feldspar $(K,Na)_2O$ $\cdot xAl_2O_3 \cdot ySiO_2 \cdot zH_2O$ | 3.3% |
| Clay $2K_2O \cdot 3MgO \cdot 8Fe_2O_3 \cdot 24SiO_2 \cdot 12H_2O$ | 0.6% |
| Shortite $Na_2CO_3 \cdot 2CaCO_3$ | 0.1% |
| Organic Matter as Elemental Carbon | 0.2% |
| Other (by Difference) | 0.2% |
| | 100.0% |

Additionally, the trona usually also contains small amounts of soluble chlorides and sulfates.

Two methods for obtaining soda ash from trona are in commercial use. The first involves calcination of crude trona at elevated temperature to yield crude sodium carbonate:

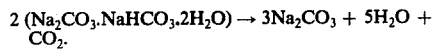

$$2(Na_2CO_3 \cdot NaHCO_3 \cdot 2H_2O) \rightarrow 3Na_2CO_3 + 5H_2O + CO_2.$$

The crude sodium carbonate thus obtained is not of sufficient purity for commercial use. Hence, it is usual practice to purify it by crystallization. The second method for obtaining commercial grade soda ash from trona involves dissolving the trona directly, to separate purified sesquicarbonate crystals from the solution, and to calcine these crystals to transform them into commercial grade soda ash.

Calcination of trona effects moisture removal, reduction or elimination of organic matter as well as transformation of the sodium sesquicarbonate into sodium carbonate. Effectiveness of reduction of organic matter increases with increasing calcination temperature. Unfortunately, however, calcination at elevated temperature also causes sodium carbonate to react with silica contained in the trona to form soluble silicates, and formation of such soluble silicates also increase with increasing calcination temperature.

Soluble silicates are a major impurity in mother liquors from which sodium carbonate precursor crystals are obtained by evaporative crystallization. Unless steps are taken to reduce soluble silicate content of such mother liquors, soluble silicates become a significant impurity in the soda ash product. In the past, levels of soluble silicates in such mother liquors as well as levels of other contaminants, such as NaCl and $Na_2SO_4$, have been controlled or maintained by purging part of the mother liquor. This, of course, entailed loss of valuable soda values.

It has already been proposed to reduce contamination by soluble silicates of aqueous sodium carbonate solutions obtained by dissolving calcined trona in aqueous media by digesting the solutions at elevated temperature above about 160° F. for time sufficient to substantially reduce the soluble silicates contained therein. Apparently, there is some interaction between the insoluble impurities and the soluble silicates in such solutions, rendering insoluble or absorbing the soluble silicates to reduce their concentration in the solution on digestion. In our co-pending U.S. appl. Ser. No. 587,585 filed of even date herewith, there is described an improvement in the process of making sodium carbonate from trona by the method involving crushing the trona, calcining it and dissolving it in an aqueous medium for purification by crystallization, which improvement results in reduction of silicate contamination of the crystallization liquor and which improvement involves (a) segregating the calcined trona into a coarse and a fine particle size fraction; (b) separately dissolving the coarse and the fine particle size fractions to obtain aqueous solution of sodium carbonate, sodium silicates and insoluble impurities; followed by (c) digesting the solution of the fine particle size fraction at elevated temperature to insolubilize soluble silicates, and separating the digested solution from insoluble impurities.

SUMMARY OF THE INVENTION

In accordance with the present invention, there is provided a method for treating soluble silicate-containing aqueous carbonate process crystallizer mother liquor from the process for making sodium carbonate precursor crystals by evaporative crystallization, which comprises:

1. digesting said mother liquor at elevated temperature, for time sufficient to reduce soluble silicates, in the presence as treating agent of activated insolubles which have been obtained by calcining crushed trona, dissolving of the calcined trona in an aqueous medium to obtain a solution comprising sodium carbonate and insolubles, separating the insolubles and activating the separated insolubles by calcining at temperatures of from about 300° C. to below about 600° C., and 2. separating the insolubles from the digested mother liquor.

Sodium carbonate precursor crystals for purposes of the present invention are those selected from the group consisting of sodium bicarbonate, sodium sesquicarbonate, anhydrous sodium carbonate, sodium carbonate monohydrate, sodium carbonate heptahydrate and sodium carbonate decahydrate.

DETAILED DESCRIPTION OF THE INVENTION AND OF THE PREFERRED EMBODIMENTS

The sodium sesquicarbonate content of naturally occurring trona can be simply transformed into sodium carbonate by calcining the trona. However, sodium carbonate obtained by calcining trona is not of sufficient purity to serve as raw material in the various applications in which soda ash is used, e.g., making glass. Hence, various methods for obtaining pure sodium carbonate from trona have been described. Generally, these can be classified into the sodium sesquicarbonate crystallization processes and the sodium carbonate crystallization processes. In the former, the trona is dissolved in water or process liquors to form a solution of sodium sesquicarbonate and insolubles. Insolubles are separated by clarification or filtration, and sodium sesquicarbonate crystals are obtained from the clarified solution, usually by evaporative crystallization. The sodium sesquicarbonate crystals are then calcined to obtain soda ash.

In the sodium carbonate method, the trona is first calcined, the calcined trona is dissolved in water or process liquors to obtain solution of sodium carbonate and insolubles. Insolubles are separated by clarification or filtration, and from the clarified solution the sodium carbonate may be obtained in the form of anhydrous, monohydrate, heptahydrate or decahydrate crystals by crystallization. The hydrated crystals are usually calcined to remove water of crystallization to obtain dense anhydrous soda ash.

It is also known to obtain sodium bicarbonate crystals from sodium carbonate or sodium sesquicarbonate solutions by introducing carbon dioxide into saturated or nearly saturated sodium sesquicarbonate or sodium carbonate solutions to precipitate the less soluble sodium bicarbonate. The sodium bicarbonate can also be transformed into sodium carbonate by calcination.

For purposes of the present invention, aqueous sodium carbonate process crystallizer mother liquors from the process of making sodium carbonate precursor crystals are substantially saturated aqueous solutions from which the sodium carbonate precursor crystals, i.e. sodium bicarbonate, sodium sesquicarbonate, anhydrous sodium carbonate, sodium carbonate monohydrate, sodium carbonate heptahydrate and sodium carbonate decahydrate may be crystallized as stable crystal phase and recovered from mother liquor. The present invention provides a method for reducing soluble silicate content of such carbonate process crystallizer mother liquor. In accordance with the present invention, the method for treating aqueous carbonate process crystallizer mother liquor from the process of making sodium carbonate precursor crystals by evaporative crystallization for the purpose of reducing the content of soluble silicate thereof comprises (1) digesting said mother liquor at elevated temperature above about 160° F, desirably at temperature in the range of from 160° to 300° F, (under superatmospheric pressure if at temperatures above about 215° to 220° F.) preferably at temperature in the range of from 185° to 210° F, for time sufficient to insolubilize soluble silicates usually for about 5 minutes to about 10 hours, desirably for about 15 minutes to about 2 hours, in the presence, as treating agent, of activated insolubles which have been obtained by (a) calcination of crushed trona, (b) dissolution of the crushed trona in an aqueous medium to obtain a solution comprising sodium carbonate and insolubles, (c) separating insolubles, (d) activating the separated insolubles by calcining at temperature of 300° C. to below 600° C.; desirably at temperature of 400° to 550°, preferably at temperature of 500° to 550° C. and (2) separating the insolubles from the digested mother liquor.

Treatment for reduction of soluble silicates in accordance with the method of the present invention reduces the amount of carbonate process crystallizer mother liquor which otherwise would have to be purged from the crystallization process in order to maintain silicate content thereof at levels sufficiently low to meet silicate specifications of the sodium carbonate product. Reduction of amount of mother liquor purge minimizes loss of soda values and pollution of the environment. Reduction of silicate content of carbonate process crystallizer mother liquor also contributes to prevention of scale formation in the process equipment since high concentrations of silicate contribute to formation of analcite scale ($NaAlSi_2O_6 \cdot H_2O$).

The insolubles which are used as treating agent for reducing soluble silicate content of aqueous carbonate process crystallizer mother liquor in accordance with the present invention are obtained as follows: Crude trona is crushed to particle size predominately smaller than three inch, preferably about one-half inch average diameter. It is then calcined, preferably at temperatures ranging from about 250° to about 1,000° F. The calcined trona is then dissolved in water or in an aqueous medium, usually an aqueous sodium carbonate solution, usually at elevated temperature, to obtain a sodium carbonate solution containing insolubles. If desired, the calcined trona may be dissolved under agitation, preferably at elevated temperature above about 160° F., preferably from 185° to 210° F., and the solution be maintained at that temperature for time sufficient to lower soluble silicate content thereof, preferably for time from between about 30 minutes to 8 hours. In any event, the insolubles are separated from the solution by any suitable method, such as sedimentation or filtration, or any combination thereof, and the separated insolubles are then activated.

Following separation from the solution and prior to their activation by calcination, the insolubles may be first brought to dryness. Any suitable means for removing water from the insolubles may be employed for that purpose. For example, the bulk of the water may be removed mechanically, e.g. in a filter press, and the insolubles may be dried in open pans or in any suitable apparatus designed to evaporate water therefrom to obtain substantially dry solid residue, as for example rotary driers or fluid bed driers, and the like.

Calcination of the dried insolubles may be effected in any equipment capable of bringing them to required calcination temperature and maintaining them at that temperature for time required to effect activation, say from 5 minutes to 10 hours, usually 15 minutes to 5 hours, preferably 15 minutes to about 1 hour. Desirably, evaporation to dryness and calcination are conducted as a single step in one piece of equipment. Choice of equipment is not a critical consideration.

In a typical trona processing operation a carbonate process solution which has been clarified and filtered is passed in series through crystallization units, typically multiple effect evaporator crystallizers. In general, three crystallizers or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The effects are numbered in the direction of flow. As the carbonate process solution passes through the crystallizers, a slurry of sodium carbonate precursor crystals is formed and passed to each succeeding crystallizer. The slurry is passed from one effect to the other in the chosen direction by a series of pumps. From the last effect the slurry, containing about 15 to 60 percent, preferably about 30 to 50 percent, solids is allowed to settle. The sodium carbonate precursor crystals are separated and the mother liquor separated from the sodium carbonate precursor crystals is combined with the freshly filtered carbonate process solution which is to be fed to the crystallizer to effect crystallization of a second crop of precursor crystals.

Exemplary prior art crystallization procedures for the processing of trona solutions may be found in the disclosures of U.S. Pat. Nos. 2,704,239 (crystallization of sodium bicarbonate); 2,770,524 (crystallization of anhydrous sodium carbonate); 2,639,217 and 3,028,215 (crystallization of sodium sesquicarbonate); and 2,343,080, 2,343,081, 2,962,348, 3,131,996 and 3,260,567 (crystallization of sodium carbonate monohydrate). In each of these prior art processes, the carbonate process solution generally first enters the crystallizer operated at highest temperature (first effect) and passes in series in the form of a slurry through the crystallizers, each succeeding one being operated at a lower temperature than the previous one. In the event the solids content of the slurry which is being pumped through the crystallizer unit becomes too thick or viscous, a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted to soda ash. The mother liquor is then recycled to the system passing through the first effect evaporator crystallizer together with clarified and filtered trona process solution not previously treated in the crystallizer. In some processes a portion of the mother liquor is used to dissolve additional trona. In each case, a part of the mother liquor is discarded as purge in order to maintain impurities within the recycled mother liquor at levels sufficiently low to meet soda ash product specification with respect to impurities, e.g. silicate. In usual operation, between about 2% and about 10%, more generally between about 3% and 5% by weight of the recycled mother liquor must be purged in order to maintain product quality. Treatment of carbonate process crystallizer mother liquor in accordance with the method of our invention reduces the amount of said liquor which must be purged.

Treatment of mother liquor in accordance with our invention simply involves adding the activated insolubles obtained as described above to the crystallizer mother liquor, preferably with agitation, and digesting the mother liquor at elevated temperature above about 160° F., desirably at temperature within the range of from 160° to 300° F., preferably within the range of from 185° to 210° F. for time sufficient to lower soluble silicate content thereof, preferably for time from between about 30 minutes and 8 hours. For the digestion step, insolubles are added to the mother liquor in amount of from 5% to 20%, preferably from 7% to 15% by weight, based on the combined weight of mother liquor and insolubles.

While it is possible to subject all the mother liquor as it is being recycled to treatment in accordance with our invention, we have found that only a small portion thereof need be treated in order to maintain silicates at desirably low levels, say at levels of less than about 2000 ppm. (basis $Na_2CO_3$) or, more preferably less than about 1500 ppm. within the mother liquor. This can readily be accomplished by treating a portion of the recycled stream or, more preferably about 3% to 5% by volume the recycled stream. It should be noted that soluble silicate reduction in accordance with our invention method does not avoid need for purging part of the mother liquor in order to reduce other impurities, such as sodium chloride and sodium sulfate which otherwise would build up to undersirable levels. Nevertheless, treatment in accordance with our invention process substantially reduces amount of liquor that must be purged.

Digestion in accordance with our invention may be carried out in any suitable vessel, open to the atmosphere or closed. In the event the mother liquor is a sodium bicarbonate or sodium sesquicarbonate solution, it may be desirable to carry out the digestion under an atmosphere of carbon dioxide in order to prevent decomposition of the bicarbonate or sesquicarbonate under formation of carbon dioxide. Following digestion, insolubles are separated from the mother liquor by usual methods, as by settlement, centrifugation, elutriation, filtration or the like, and the mother liquor is recycled to the crystallization step.

The following examples wherein parts are by weight illustrate the method of the present invention.

EXAMPLES a. Preparation of Activated Insolubles.

Crude trona was crushed to particle size of less than about one-half inch and was calcined in a direct fired rotary furnace at temperature of about 350° F. The dust discharged with the gaseous effluent from the furnace was combined with the furnace discharge, and the combined dust and furnace discharger were dissolved in sodium carbonate crystallizer mother liquor to obtain sodium carbonate solution containing about 28% by weight of $Na_2CO_3$. Thereafter, insolubles were allowed to settle and the supernatant liquid was decanted. Excess liquor was drained from the insolubles and the drained insolubles were dried in a pan, followed by calcination in a muffle furnace at the temperatures and for the times indicated in the Table below.

b. Digestion of Sodium Carbonate Mother Liquor

A vessel equipped with stirrer and cover immersed in an oil bath maintained at 90° C. with thermostatic control was charged with 300 parts sodium carbonate crystallizer purge liquor containing about 30% $Na_2CO_3$ and 2,300 ppm., basis weight of the purge liquor of silicate, expressed as $SiO_2$. Activated insolubles obtained as described above were added in amount sufficient to give a 10% by weight slurry of insolubles. After 30 minutes at 90° C., fifty ml. samples of the slurry were withdrawn, and were filtered through a 0.22 micron millipore filter into 50 ml. of water. Silicate level in the water was determined by acidifying the sample to pH 1.4, adding ammonium molybdate to form the yellow complex, followed by determination of absorbance at 410 m$\mu$ in an electrophotometer. Corresponding silicate concentrations were read from appropriate standard curves. The Table below shows the results obtained:

TABLE

| Run No. | Insolubles | Soluble Silicates, as ppm $SiO_2$, basis purge liquor |
|---|---|---|
| 1 | not activated | 1,770 |
| 2 | calcined at 500° C. for 25 minutes | 732 |
| 3 | calcined at 550° C. for 45 minutes | 690 |
| 4 | calcined at 600° C. for 45 minutes | 1,710 |

In the above Table, Run No. 1 is a comparative experiment employing insolubles for treatment which have been obtained as those employed in Runs 2 and 3, which are Examples, except that the insolubles employed in Run No. 1 have not been activated by calcination. Run No. 4, a Comparative Experiment, illustrates criticality of the requirement that activation of the insolubles be effected at temperatures below 600° C.

We have further found that, if the insolubles following separation from the sodium carbonate liquor are washed prior to activation by calcination, so as to remove sodium carbonate solution adhering thereto, as for example by washing the insolubles with water as by slurrying them in water, then calcination at temperatures of 300° to below 600° C. does not result in their activation. Thus, when the above-described procedure was repeated, except that the insolubles obtained by dissolving the calcined trona in the sodium carbonate crystallizer mother liquor after separation from the liquor were first water-washed, then dried at about 100° C., and one portion was calcined at 500° C. for 25 minutes and another portion was calcined at 550° C. for 45 minutes, crystallizer mother liquor treated with these activated insolubles by the above-described procedure yielded soluble silicate contents expressed as $SiO_2$, of 1,731 and 1,770 ppm, respectively. However, when such washed insolubles are calcined at temperatures of 600° C. or above, they also become activated and become capable of reducing soluble silicate content of crystallizer mother liquor from which sodium carbonate crystals are obtained.

While the above Examples illustrate reduction of silicate contamination in sodium carbonate crystallizer mother liquor, similar results are obtained when sodium bicarbonate or sodium sesquicarbonate crystallizer mother liquors are treated by this method, that is to say, soluble silicate levels are substantially reduced by digesting mother liquors containing sodium bicarbonate or sodium sesquicarbonate at elevated temperature for time sufficient to reduce soluble silicates in the presence, as treating agent, of the above-described activated insolubles.

As previously stated, soluble silicate reduction in accordance with our invention method reduces, but does not avoid need for purging part of the mother liquor in order to reduce other impurities, such as chlorides and sulfates, which otherwise would build up to undesirable levels. However, our invention also provides means for recovering a substantial part of the sodium carbonate values from the liquor which must be committed to purge in order to maintain chloride and sulfate levels within tolerable limits. In accordance with our invention, the liquor which is to be committed to purge (purge liquor) is first digested at elevated temperature for time sufficient to reduce soluble silicates, in the presence as treating agent of insolubles which have been obtained by calcination of crushed trona, dissolution of the calcined trona in an aqueous medium to obtain a solution comprising sodium carbonate and insolubles, separating the insolubles and activating the separated insoluble by calcination, as above described. Following digestion of the purge liquor in the presence of such activated insolubles, the insolubles are separated from the digested purge liquor. This treatment, as above explained, results in reduction of soluble silicates. It does not, however, reduce chlorides and sulfates. The liquor so treated is then subjected to conditions under which sodium carbonate monohydrate is crystallized therefrom. We have found that the sodium carbonate monohydrate crystals substantially reject sulfates and chlorides, so that the sodium carbonate monohydrate crystals thus obtained from the treated purge liquor are substantially free of silicates, as well as of chlorides and sulfates. The crystals thus recovered can be combined with the sodium carbonate precursor crystals obtained in the process, or they may be separately calcined to obtained dense soda ash. The mother liquor of the sodium carbonate monohydrate crystallization from the treated purge liquor is discarded. Optionally, the digested purge liquor freed from insolubles is further treated with activated carbon to reduce carbonaceous impurities therefrom, in known manner, prior to crystallizing sodium carbonate monohydrate crystals therefrom. This scheme permits substantial recovery of relatively high purity sodium carbonate from the purge liquor.

Since various changes may be made in carrying out the process of our invention without departing from its scope and essential characteristics, it is intended that all matter contained in the above description shall be interpreted as illustrative only, and not in a limiting sense.

We claim:

1. The method for treating aqueous carbonate process crystallizer mother liquor from the process for making sodium carbonate precursor crystals by evaporative crystallization which comprises:
   a. digesting said mother liquor at elevated temperature, for time sufficient to reduce soluble silicates, in the presence as treating agent of activated insolubles which have been obtained by calcining of crushed trona, dissolution of the crushed trona in a aqueous medium to obtain a solution comprising sodium carbonate and insolubles, separating the insolubles from the solution and activating the separated insolubles by calcining at temperature of 300° to below 600° C., and
   b. separating the insolubles from the digested mother liquor.

2. The method of claim 1 wherein the insolubles have been activated by calcining at temperature between about 400° C. and about 550° C.

3. The method of claim 2 wherein the mother liquor is digested at temperature of from about 185° to about 210° F.

4. The method of claim 3 wherein the mother liquor is digested for time period of from about 30 minutes to about 8 hours.

5. The method of claim 4 wherein the insolubles are employed in amount of about 5 to about 20 percent by weight, based on the combined weight of mother liquor and insolubles.

6. The method of claim 2 wherein the mother liquor is digested at temperature above about 160° F.

7. The method of claim 1 wherein the mother liquor is digested at temperature of from about 185° to about 210° F. for time period of from about 30 minutes to about 8 hours.

8. The method of claim 7 wherein the insolubles use employed in amount of about 5 to 20 percent by weight, based on the combined weight of mother liquor and insolubles.

9. The method of claim 1 wherein the mother liquor is digested at temperature above about 160° F.